(12) United States Patent
Harding

(10) Patent No.: US 6,930,763 B2
(45) Date of Patent: Aug. 16, 2005

(54) THREE DIMENSIONAL SENSOR LASER NOISE REDUCTION METHOD

(75) Inventor: Kevin George Harding, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 693 days.

(21) Appl. No.: 09/683,355

(22) Filed: Dec. 18, 2001

(65) Prior Publication Data

US 2003/0112450 A1 Jun. 19, 2003

(51) Int. Cl.$^7$ ................................................. G01C 3/00
(52) U.S. Cl. ........................................................ 356/3.1
(58) Field of Search .............................. 356/3.01, 3.1, 356/3.14–3.16, 3.05, 623

(56) References Cited

U.S. PATENT DOCUMENTS

| | | | | |
|---|---|---|---|---|
| 3,804,521 A | * | 4/1974 | Sprague | 356/512 |
| 3,893,129 A | * | 7/1975 | Endo et al. | 346/77 E |
| 5,048,044 A | * | 9/1991 | Ireland | 372/66 |
| 5,325,177 A | * | 6/1994 | Peterson | 356/505 |
| 5,589,942 A | | 12/1996 | Gordon | 356/376 |
| 5,621,529 A | | 4/1997 | Gordon et al. | 356/376 |
| 5,811,827 A | * | 9/1998 | Pryor et al. | 250/559.31 |

OTHER PUBLICATIONS

Kevin Harding & D. Svetkoff, "3D Laser Measurements On Scattering And Translucent Surfaces", SPIE Proceedings vol. 2599, Three–dimensional and Unconventional Imaging for Industrial Inspection and Metrology, editor Harding, Phil. Oct. 1995, pp. 217–227.

Kevin Harding, "Speckle Reduction Methods for Laser Line Gages", Proceedings, SPIE vol. 3204, editor K. Harding, pp. 137–144, (1997).

* cited by examiner

Primary Examiner—Mehrdad Dastouri
Assistant Examiner—Sath V. Perungavoor
(74) Attorney, Agent, or Firm—Jean K. Testa; Christian G. Cabou

(57) ABSTRACT

A method for improving the accuracy of measurements made in non-contact gauging an object utilizing a detector to observe a laser line projected onto a surface of the object. A combination of detector lens f-number adjustments, surface scatter statistics, and laser coherence control are utilized to reduce speckle noise in the structured light gauge measurement system without the use of moving mechanical parts. This eliminates added mechanical motion errors and maximizes detectable laser light.

9 Claims, 1 Drawing Sheet

US 6,930,763 B2

THREE DIMENSIONAL SENSOR LASER NOISE REDUCTION METHOD

BACKGROUND OF THE INVENTION

The use of laser lines as a tool for non-contact measurement gauging of an object is well established. Laser lines are projected onto the object being gauged, and an image of the projected lines is observed by one or more detectors for use in triangulation measurements. However, laser lines used in structured light systems for measurement gauging of objects contain coherent noise, such as speckle, which limits the performance of the system.

One approach to increase the measurement accuracy of laser based measurement gauges has been to reduce the size of the laser spot or laser line thickness projected onto the surface of the object undergoing measurement gauging. However, in the case of a smaller projected spot or thinner line projection, on the order of a few tens of microns in diameter or cross-section, the coherent speckle created by the surface characteristics of the object onto which the laser is projected can become very large, even compared to the size of the viewing lens, and hence are seen as continuous patterns of light at the detectors.

This problem has been previously addressed by scanning the laser spot or beam along the length of the projected line. This is often done by rapidly scanning a single laser point to form the projected image of a line, or merely moving a projected image of a laser line back and forth slightly in a dithering motion. Movement of the laser beam along the length of the projected line averages out the coherent speckle perceived as noise by the detectors. While these methods average out the coherent speckle noise, they reduce available light energy received by the detectors, and add additional sources of error associated with the position of the line due to the wobble present in the mechanical scanning or dithering systems.

Accordingly, there is a need for a method to reduce coherent speckle noise observed in projected laser lines used for the measurement gauging of an object, without reducing the light energy available for detection or introducing additional mechanical scan errors into the measurement system.

SUMMARY OF THE INVENTION

Briefly stated, the present invention uses a combination of a detector lens f-number, data regarding object surface scatter, and laser coherence control, to reduce speckle noise in a structured light gauge measurement system. This is done without use of moving mechanical parts, thereby eliminating mechanical motion errors and maximizing detectable laser light.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
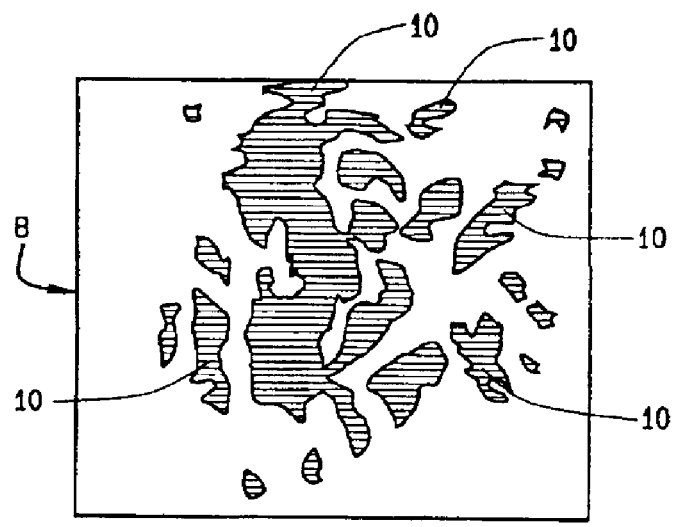
FIG. 1 is an example of a speckle field created by laser light scattering off a rough metal surface.

Laser light reflected and scattered from the surface of an object 8 is perceived by detectors in an optical measurement system as individual points or spots 10 of light and dark contrast, known as "speckle", shown in FIG. 1. Classic "speckle" noise is a light interference phenomena dependent upon the wavelength and aperture size of the viewing system. Therefore, a low lens f-number on the detector typically reduces the size of observed speckles 10. For example, a f/2 lens system produces speckles 10 which are approximately 2.3 microns in size, from light projected onto a uniform scattering surface such as a diffuse white object.

However, surface features on an object onto which a laser spot or laser line is projected affect the manner in which the projected laser light is reflected and scattered, based upon the facets of the microfinish of the object. When a laser beam is incident on an opaque, rough surface, as seen in FIG. 1, the micro-structures of the surface act as through it is made of a range of small mirrors, pointing in numerous directions. These micro-mirrors may reflect the light in a particular direction, as machine marks generally do, or may direct the light along the surface of the part. Depending on how random or directional the point of these micro-mirrors or scattering centers may be, the apparent spot seen on the surface will not be a direct representation of the light beam as incident on the part surface.

As the scattering centers on the part surface increase in size, the uniform points will be enlarged and modulated by the surface scattering centers, so to produce a 'speckly' point of bright and dark areas. Surfaces which are very rough or translucent tend to spread the laser light out over an extended region, forming coherent speckles and creating an uncertainty blob which can lead to false measurements.

In the case of a very small laser spot or laser line (a few tens of microns in width), the coherent speckle effect created by the surface of the object can be very large, even compared to the size of the viewing lens, and hence is seen as a continuous light pattern by the detector. Any laser light scattering off a rough surface produces a light field with a characteristic laser speckle distribution. The size of the coherent speckle points on a pixel in an image is a function of the convolution of the inverse Fourier transform of the scatter distribution, and the impulse response of the lens. This latter is determined by the lens f-number and the diffraction equation for a lens aperture; i.e.:

$$S = (\text{wavelength})(f\text{-number}) \qquad \text{Eqn. 1}$$

Scatter distribution is the diffraction driven size of a scattering center on the object surface.

Figure 2:
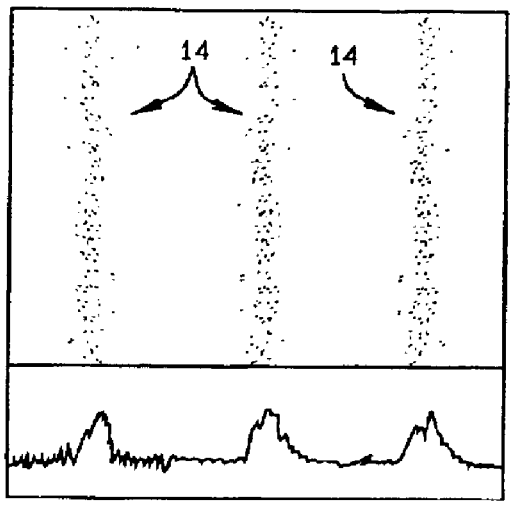
FIG. 2 is an enlarged view of prior art laser lines projected onto the surface of an object, including a representation of the laser distribution.
Figure 3:
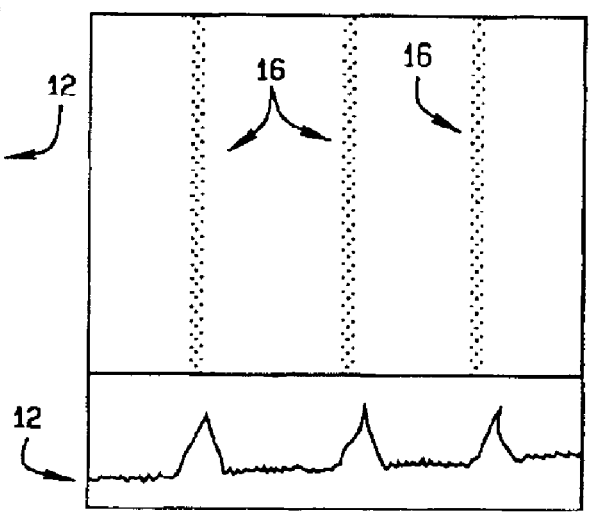
FIG. 3 is an enlarged view of laser lines of the present invention projected onto the surface of an object, including a representation of the laser distribution.

In one embodiment of the present invention, a slab diode laser is utilized to generate a laser line projected onto the surface of an object undergoing gauge measurement. A slab diode laser is a diode that is very small in one dimension, and very large in another dimension. The result is a beam that is very coherent on one dimension, and which can be focused to a narrow line, while in the other direction it exhibits a multiple mode structure that degrades the coherence, and hence the contrast of any speckle. This can be seen by comparing FIGS. 2 and 3, illustrating the cross-sectional distribution 12 of projected laser lines 14 from a conventional laser and of projected laser lines 16 from a slab diode laser. Those skilled in the art will understand that the laser coherence relative to the structure of the surface scatter reduces speckle noise. The speckle contrast caused by the slab diode laser is fixed to a known value.

Using the known value of speckle contrast from the slab diode laser, the "maximum" speckle size on a detector pixel, before the speckle noise becomes a problem, can be calculated. Preferably, speckle size is limited to no more than 10 percent of the size of an individual pixel comprising the image generated by the detector. In this manner, the contrast of the speckle effect is reduced to a small percentage of the total light received by the detector on the pixel. The speckle size can then be adjusted to smaller than the maximum size using the detector lens f-number, and the surface scatter convolution relationship.

In one embodiment of the invention, impulse response of the lens is measured. The impulse response is the size of the smallest spot generated by the lens while it is imaging an infinitely small spot, or a spot which is much smaller than it is able to resolve. With fast lens focusing on a detector, the speckle is kept to a minimum size. For example, an f/5 lens will create speckle of about 3 microns in size. As long as the detector element sees many speckles at once, their effect is averaged out. Hence, reducing the f-number of the detector lens focusing an image of a projected laser line onto the detector pixel or sensing element, reduces the size of observed coherent speckles. More coherent speckles impinge upon the detector sensing element and they are averaged out. However, reducing the f-number limits the focus depth of the lens; and accordingly, must be balanced with the depth-of-field required to fully image the object being gauged.

The effect of a rough surface on an object undergoing gauge measurement is to create speckle related to the effective aperture size of the surface roughness features, which will then further modulate the speckle pattern on the detector. Ideally, the lens f-number is selected so as to reduce speckle size to approximately ten percent of the size of an individual pixel forming the image. In this manner, the effect of speckle contrast on the overall pixel light intensity level is reduced to a few percent due to an averaging of the speckles by pixel size.

As the ideal low detector lens f-number is traded off for depth-of-field and general image quality, there are fewer speckles on a given detector image pixel. Accordingly, the change in light level on the image pixel becomes more dependent on the addition or subtraction of one speckle spot. For a high coherence laser, speckle can start with a contrast of close to 100 percent. So, if there are ten bright spots on a pixel formed by laser speckle, and a small movement of the image reduces this to only nine bright spots, the intensity on that pixel will change by ten percent. However, if the contrast of the initial speckle spots is reduced by a factor of four, for example by using a slab diode laser, then the change in pixel light level intensity due to a change in the number of speckle spots, i.e. speckle noise, is only 2.5 percent per speckle.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for reducing laser speckle noise observed in an image by a detector in a non-contact non-moving gauge measurement system, comprising:

projecting laser light having known speckle contrast onto a surface of an object;

establishing, using said known speckle contrast and known non-contact non-moving gauge measurement system accuracy limitations, a maximum observable speckle size;

selecting a detector lens having a lens f-number such that the size of the observed speckle points in said image is smaller than said maximum observable speckle size; and observing a laser light scatter distribution on the surface of said object, wherein the size of the laser speckle noise observed by said detector in said image is determined by a convolution of the inverse Fourier transform of said laser light scatter distribution, and an impulse response of said detector lens.

2. The method of claim 1 for reducing laser speckle noise wherein said impulse response of said detector lens is determined from said detector lens f-number and a diffraction equation for a lens aperture.

3. The method of claim 1 for reducing laser speckle noise wherein said laser light is projected from a slab diode laser.

4. A method for reducing speckle noise present in an image of a laser line projected onto a surface of an object and observed trough a lens by a detector, comprising:

observing laser light scatter distribution on the surface of the object, wherein the size of the speckle noise observed through said lens by said detector in said image is determined by a convolution of the inverse Fourier transform of said laser light scatter distribution, and an impulse response of said lens;

utilizing said observed laser light scatter distribution to identify a minimum speckle noise size obtainable through lens f-number reduction;

determining a lens f-number value corresponding to said identified minimum speckle noise size; and altering said lens by adjusting said lens f-number to said determined value.

5. The method of claim 4 for reducing speckle noise present in an image of a laser line, further comprising:

observing the surface finish characteristics of said object; and altering the coherence of said laser relative to said observed surface finish characteristics to reduce speckle noise.

6. The method of claim 5 for reducing speckle noise present in an image of a laser line wherein said laser coherence is reduced.

7. The method of claim 5 for reducing speckle noise present in an image of a laser line, further comprising:

measuring a range of light scatter angles in said observed laser light scatter distribution from the surface finish of the object; and wherein said range of scatter angles defines a minimum speckle noise size obtainable through lens f-number reduction.

8. A method for reducing speckle noise present in an image of a laser line projected onto a surface of an object and observed through a lens by a detector, comprising:

observing laser light scatter distribution on the surface of the object, wherein the size of the speckle noise observed through said lens by said detector in said image is determined by a convolution of the inverse Fourier transform of said laser light scatter distribution, and an impulse response of said lens;

utilizing said observed laser light scatter distribution to identity a minimum resolving power required so observe said projected laser line to within a predetermined range of measurement accuracy; and altering said lens by reducing a lens f-number to a minimum value having a resolution corresponding to said identified minimum resolving power.

9. The method of claim 8 for reducing speckle noise present in an image further including reducing the coherence of laser light projected onto the surface of said object relative to the structure of the surface scatter.

* * * * *